(12) United States Patent
Shimada

(10) Patent No.: US 8,085,643 B2
(45) Date of Patent: Dec. 27, 2011

(54) OPTICAL INFORMATION REPRODUCING APPARATUS, OPTICAL INFORMATION RECORDING AND REPRODUCING APPARATUS

(75) Inventor: Kenichi Shimada, Yokohama (JP)

(73) Assignee: Hitachi Consumer Electronics Co., Ltd., Tokyo (JP)

( * ) Notice: Subject to any disclaimer, the term of this patent is extended or adjusted under 35 U.S.C. 154(b) by 66 days.

(21) Appl. No.: 12/611,948

(22) Filed: Nov. 4, 2009

(65) Prior Publication Data

US 2010/0128591 A1 May 27, 2010

(30) Foreign Application Priority Data

Nov. 26, 2008 (JP) .................................. 2008-300338

(51) Int. Cl.
*G11B 7/00* (2006.01)
(52) U.S. Cl. ........................................................ 369/103
(58) Field of Classification Search .................. 369/103; 359/1, 10, 11, 24
See application file for complete search history.

(56) References Cited

U.S. PATENT DOCUMENTS

| | | | |
|---|---|---|---|
| 5,892,601 A | 4/1999 | Curtis et al. | |
| 6,256,281 B1 * | 7/2001 | Tanaka et al. | 369/103 |
| 7,190,656 B2 * | 3/2007 | Kim | 369/103 |
| 7,548,360 B2 * | 6/2009 | Brotherton-Ratcliffe et al. | 359/35 |
| 7,636,171 B1 * | 12/2009 | Sigel et al. | 356/625 |
| 7,760,408 B2 * | 7/2010 | Uno et al. | 359/24 |
| 7,848,204 B2 * | 12/2010 | Lan et al. | 369/103 |
| 7,889,619 B2 * | 2/2011 | Tokuyama | 369/112.16 |
| 2003/0026542 A1 | 2/2003 | Yoshikawa et al. | |
| 2004/0179251 A1 * | 9/2004 | Anderson et al. | 359/3 |
| 2004/0218241 A1 * | 11/2004 | Roh | 359/35 |
| 2005/0122549 A1 * | 6/2005 | Goulanian et al. | 359/3 |
| 2006/0262701 A1 | 11/2006 | Okada et al. | |
| 2007/0121469 A1 | 5/2007 | Torii | |
| 2009/0040903 A1 * | 2/2009 | Tokuyama | 369/103 |
| 2009/0116086 A1 * | 5/2009 | Uno et al. | 359/22 |
| 2009/0141612 A1 * | 6/2009 | Mitsuya | 369/103 |
| 2009/0175149 A1 * | 7/2009 | Bae et al. | 369/103 |
| 2009/0316237 A1 * | 12/2009 | Uno et al. | 359/1 |
| 2010/0123944 A1 * | 5/2010 | Ito | 359/11 |
| 2010/0271922 A1 * | 10/2010 | Iwamura et al. | 369/103 |

FOREIGN PATENT DOCUMENTS

| | | |
|---|---|---|
| JP | 08-339157 | 12/1996 |
| JP | 09-034341 | 2/1997 |
| JP | 09-305094 | 11/1997 |
| JP | 2000-338847 | 12/2000 |
| JP | 2003-248416 | 9/2003 |
| JP | 2004-272268 | 9/2004 |
| JP | 2006-343714 | 12/2006 |
| JP | 2007-149253 | 6/2007 |
| JP | 2007-280465 | 10/2007 |

* cited by examiner

*Primary Examiner* — Wayne Young
*Assistant Examiner* — Brenda Bernardi
(74) *Attorney, Agent, or Firm* — Antonelli, Terry, Stout & Kraus, LLP.

(57) ABSTRACT

In holographic recording by the angle multiplexing method, in order to allow a signal beam and a reference beam to sufficiently overlap with each other in a storage medium to decrease as much as possible a wastefully exposed region, which does not contribute to a signal recording, an optical pickup apparatus having a function which can control, for example, a size or a position of an aperture of the reference beam is used. An optical information reproducing apparatus or an optical information recording and reproducing apparatus using the optical pickup apparatus is used.

12 Claims, 13 Drawing Sheets

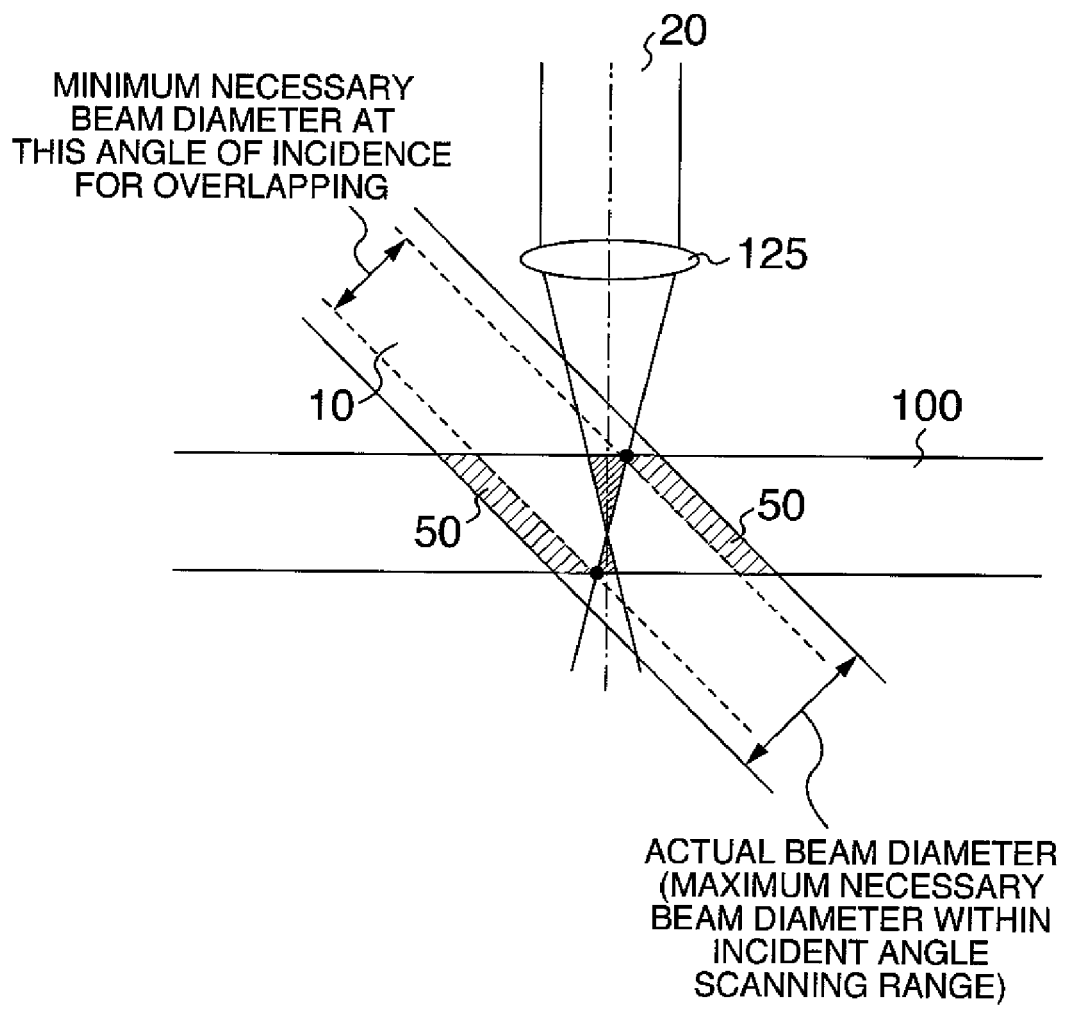

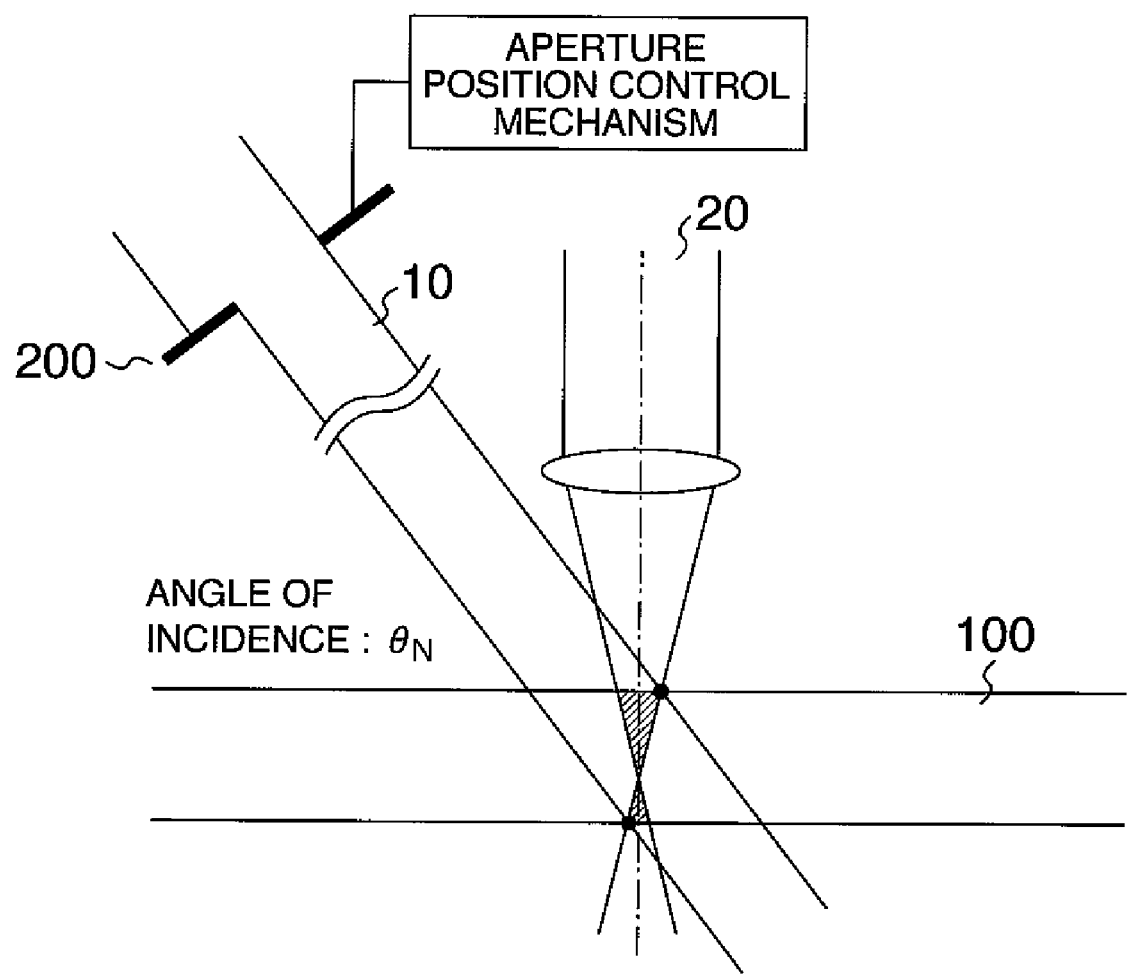

A PART OF REPRODUCTION IMAGE BECOMES DARK

OPTICAL INFORMATION REPRODUCING APPARATUS, OPTICAL INFORMATION RECORDING AND REPRODUCING APPARATUS

INCORPORATION BY REFERENCE

The present application claims priority from Japanese application JP-A-2008-300338 filed on Nov. 26, 2008, the content of which is hereby incorporated by reference into this application.

BACKGROUND OF THE INVENTION

The invention relates to an apparatus for recording information onto an optical information storage medium and/or reproducing the information from the optical information storage medium by using holography.

DESCRIPTION OF THE RELATED ARTS

At present, consumer products of optical discs having a recording density of about 50 GB can be also realized by a Blu-ray Disc (BD) standard or the like using a blue violet semiconductor laser. Even in the optical discs, the realization of a large capacity of about 100 GB to 1 TB which is almost equal to a capacity of an HDD (Hard Disc Drive) will be demanded in future.

In order to realize such a super high density as mentioned above by an optical disc, however, a new storage technique different from a trend of the conventional high-density technique promoting shorter wavelengths and higher NA of an objective lens is necessary.

Studies have been pursued with respect to a storage technique of the next generation. Among them, attention has been paid to holographic recording techniques for recording digital information by using the holography.

The holographic recording technique is a technique in which a signal beam having information of page data which has been two-dimensionally modulated by a spatial light modulator and a reference beam are overlaid in the storage medium, and a refractive index modulation is caused in the storage medium by an interference pattern generated at this time, thereby recording the information.

Upon reproduction of the information, when the reference light beam used upon recording is exposed onto the storage medium in a same layout, a hologram recorded in the storage medium acts like a diffraction grating, thereby causing a diffracted beam. This diffracted beam is reproduced as an identical light beam including the recorded signal beam and phase information.

The recovered signal beam is two-dimensionally detected at high speed by using a photodetector such as CMOS, CCD, or the like. As mentioned above, according to the holographic recording, the two-dimensional information is simultaneously recorded/reproduced by one hologram and a plurality of page data can be overwritten at the same location. Therefore, it is effective to the high-speed and large capacity information recording/reproduction.

As a holographic recording technique, there is a technique disclosed in, for example, JP-A-2004-272268. The above publication discloses what is called the angle multiplexing recording method in which a signal beam is converged onto an optical information storage medium by a lens and, at the same time, reference light of parallel beam is exposed so as to interfere with the signal beam, thereby performing a holographic recording, and further, different page data is displayed to a spatial light modulator while changing an angle of incidence of the reference beam to the optical storage medium, thereby performing the multiplexing recording. The above publication also discloses a technique in which by converging the signal beam by the lens and arranging an aperture (spatial filter) to its beam waist, the interval between adjacent holograms can be narrowed and the recording density/capacity can be increased to a value larger than that in the conventional angle multiplexing recording method.

As a background art of the present technical field, there are JP-A-9-305094 and JP-A-2003-248416. Both of them disclose a point that an aperture is controlled.

SUMMARY OF THE INVENTION

In the holographic recording of the angle multiplexing recording system, in order to improve the number of multiplexing recording times in order to realize a large capacity, it is necessary to form a thick hologram in the storage medium so that Bragg selectivity appears recognizably. In order to form the thick hologram, it is necessary that the reference beam and the signal beam sufficiently overlap along a depth direction of the storage medium.

For this purpose, as shown in FIGS. 1A and 1B, it is important to set a beam diameter of the reference beam so as to perfectly cover the signal beam 20 even for any angle of incidence of the reference beam within an angle scanning range (for example, range from $\theta_1$ to $\theta_N$) of the reference beam.

As shown in FIGS. 2A and 2B, when the angle of incidence of the reference beam is scanned, the minimum beam diameter of the reference beam which is necessary to perfectly cover the signal beam 20 in the storage medium takes different values depending on the angle of incidence of the reference beam as will be obvious from a viewpoint of geometry. For example, the beam diameter of the reference beam which is necessary to perfectly cover the signal beam at the angle of incidence shown in FIG. 2A is larger than that in FIG. 2B. Therefore, conventionally, the beam diameter of the reference beam is ordinarily set to the fixed maximum value that the beam diameter of the reference beam requires within the incident angle scanning range of the reference beam.

However, if the beam diameter of the reference beam is fixed to the maximum value mentioned above, in the case of such a reference beam incident angle that the reference beam having even more narrower beam diameter can sufficiently overlap the signal beam inherently, the reference beam of the beam diameter which is larger than it is necessary is exposed. Thus, as shown in FIG. 3, larger regions exposed wastefully which do not contribute to the recording of the signal are generated in the storage medium.

The generation of such wastefully exposed regions becomes disadvantageous for the large capacity and the high density recording because the region for the signal recording is wastefully consumed. If a storage medium of higher performance is used in consideration of the generation of the wasteful exposure regions, it cannot help designing the specifications of the storage medium more severely, so that it is very disadvantageous to the realization of low cost storage medium.

There is none of a disclosure and a suggestion in JP-A-9-305094 and JP-A-2003-248416 with respect to the foregoing problems.

It is an object of the invention that in case of recording and/or reproducing, by controlling a size or a position of an aperture arranged in the optical path of the reference beam, the wastefully exposed region on the storage medium is reduced and the reference beam is exposed to a proper position on the storage medium.

The object of the invention can be accomplished, for example, by controlling the size or position of the aperture of the reference beam.

According to the invention, in case of recording and/or reproducing, the wastefully exposed region on the storage medium can be reduced.

Other objects, features and advantages of the invention will become apparent from the following description of the embodiments of the invention taken in conjunction with the accompanying drawings.

BRIEF DESCRIPTION OF THE DRAWINGS

FIG. 3 is a schematic diagram representing a state where wastefully exposed regions generated when the signal beam and the reference beam overlap and the hologram is formed;

FIGS. 7A to 7C are schematic diagrams representing a state where a position of the aperture is controlled upon recording;

DETAILED DESCRIPTION OF THE EMBODIMENTS

Embodiments of the invention will be described below.

Embodiment 1

Figure 1A:
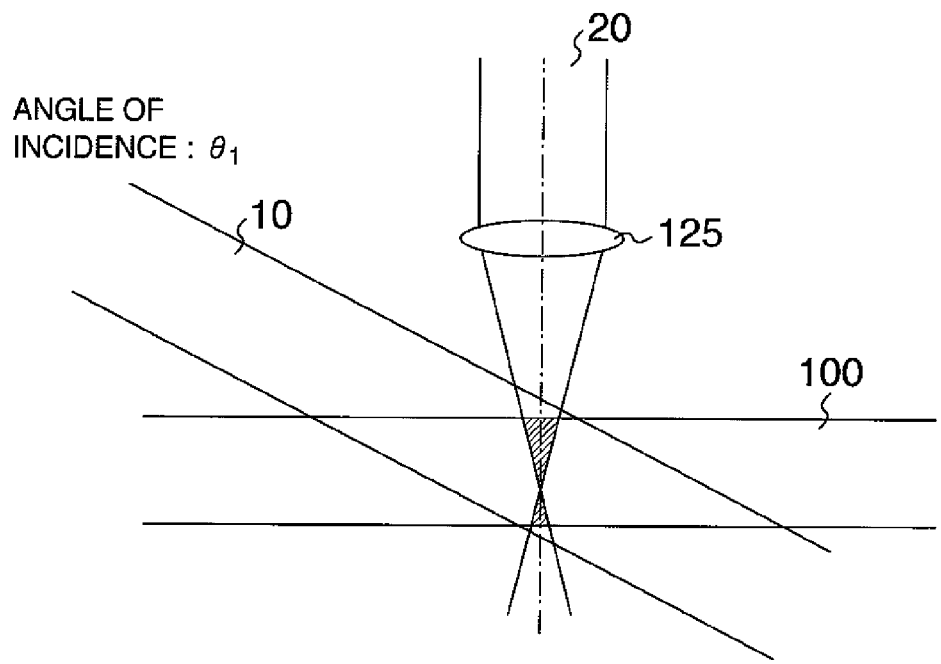
FIGS. 1A and 1B are schematic diagrams representing a state where a signal beam and a reference beam overlap and a hologram is formed.
Figure 1B:
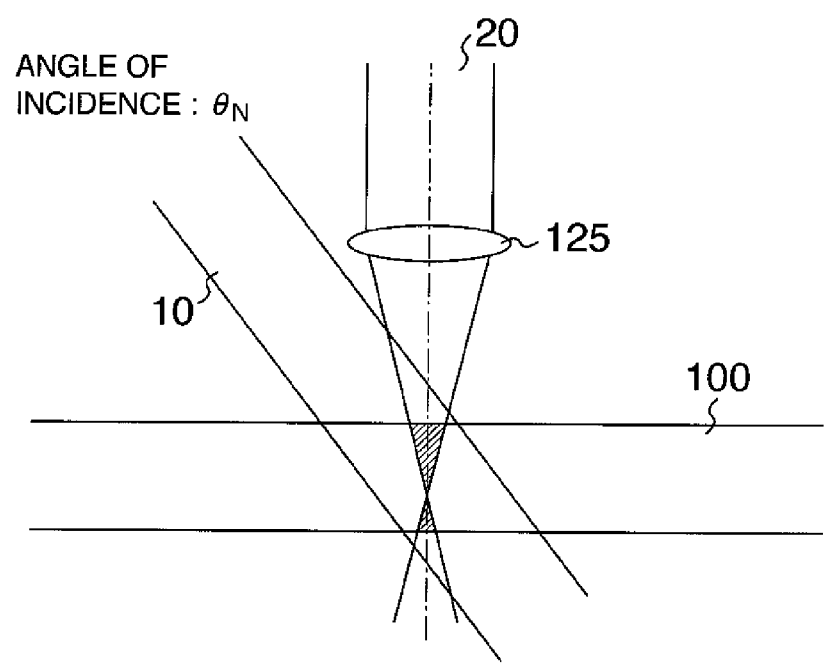
Figure 2A:
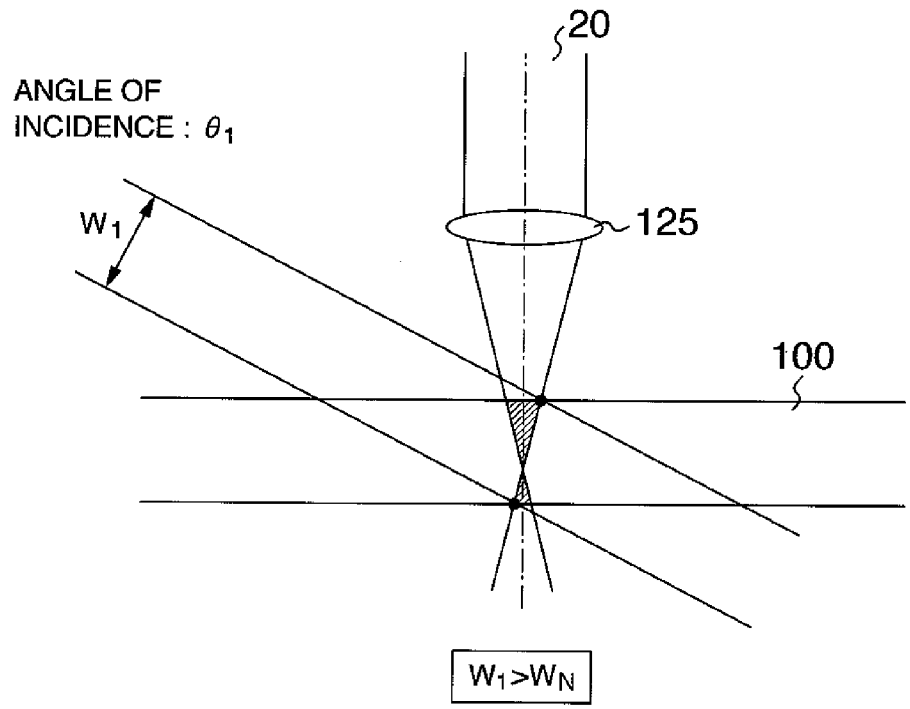
FIGS. 2A and 2B are diagrams in the case where attention is paid to a size of light beam of the reference beam when the signal beam and the reference beam overlap and the hologram is formed.
Figure 2B:
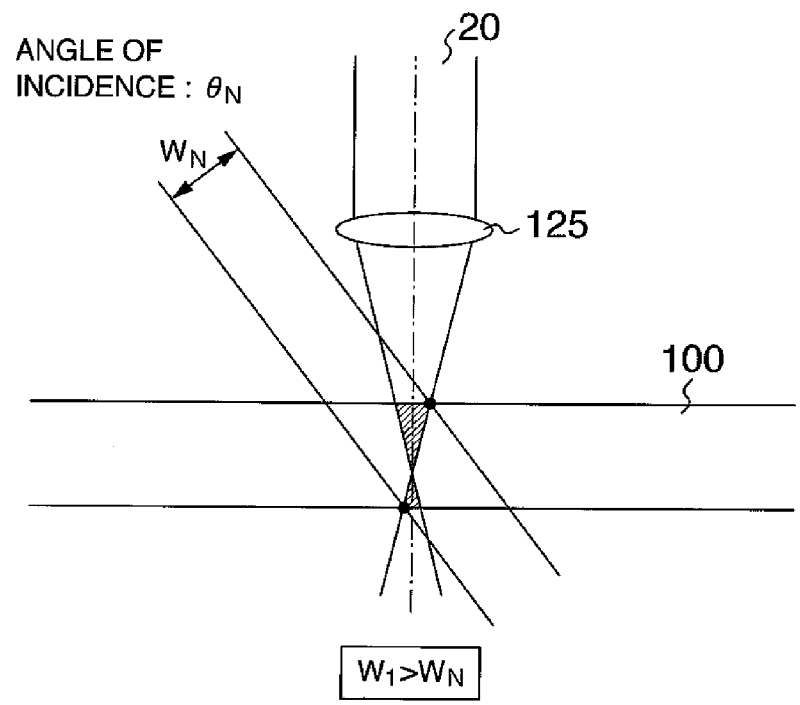
Figure 4:
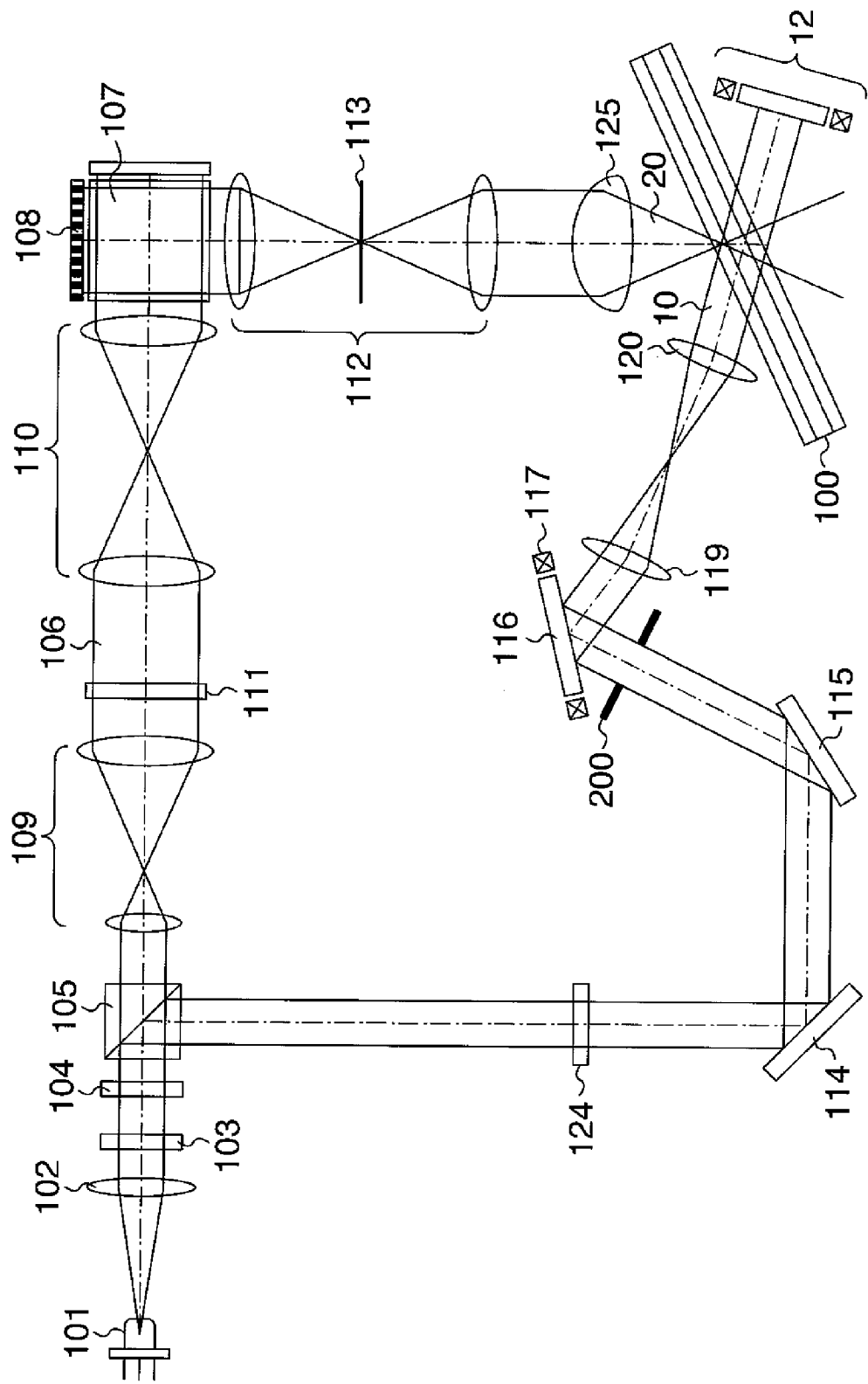
FIG. 4 is a schematic diagram representing an embodiment of an optical pickup apparatus.

FIG. 4 represents an embodiment of an optical pickup apparatus according to the invention.

A light beam emitted from a light source 101 passes through a collimator lens 102 and enters a shutter 103. When the shutter 103 is open, the light beam passes through the shutter 103 and, thereafter, its polarizing direction is controlled by an optical device 104 composed by, for example, a half-wave plate or the like so that a light amount ratio of P-polarized light and an S-polarized light is equal to a desired ratio. After that, the light beam enters a PBS (Polarization Beam Splitter) prism 105.

A diameter of the light beam which passed through the PBS prism 105 is increased by a beam expander 109 and, thereafter, the light beam 106 enters a spatial light modulator 108 through a phase mask 111, a relay lens 110, and a PBS prism 107.

The signal light beam to which information was applied by a spatial light modulator 108 passes through the PBS prism 107 and propagates through a relay lens 112 and a spatial filter 113. After that, the signal light beam is converged onto an optical information storage medium 100 by an objective lens 125.

The light beam reflected by the PBS prism 105 functions as a reference beam and is set to a predetermined polarizing direction in accordance with the recording mode or the reproducing mode by a polarizing direction converting device 124. After that, the light beam is reflected by mirrors 114 and 115 and enters an aperture 200 which specifies a size of the reference beam. The reference beam converged to a desired light beam size enters a galvano-mirror 116. Since an angle of the galvano-mirror 116 can be adjusted by an actuator 117, an angle of incidence of the reference beam, which enters the optical information storage medium 100 after it passed through lenses 119 and 120, can be set to a desired angle.

By allowing the signal beam and the reference beam to enter so as to mutually overlap in the optical information storage medium 100 as mentioned above, an interference pattern is formed in the storage medium. The information is recorded by writing such a pattern to the storage medium. Since the angle of incidence of the reference beam which enters the optical information storage medium 100 can be changed by the galvano-mirror 116, the angular multiplexing recording can be performed within an angle range, for example, from $\theta_1$ to $\theta_N$.

Figure 5A:
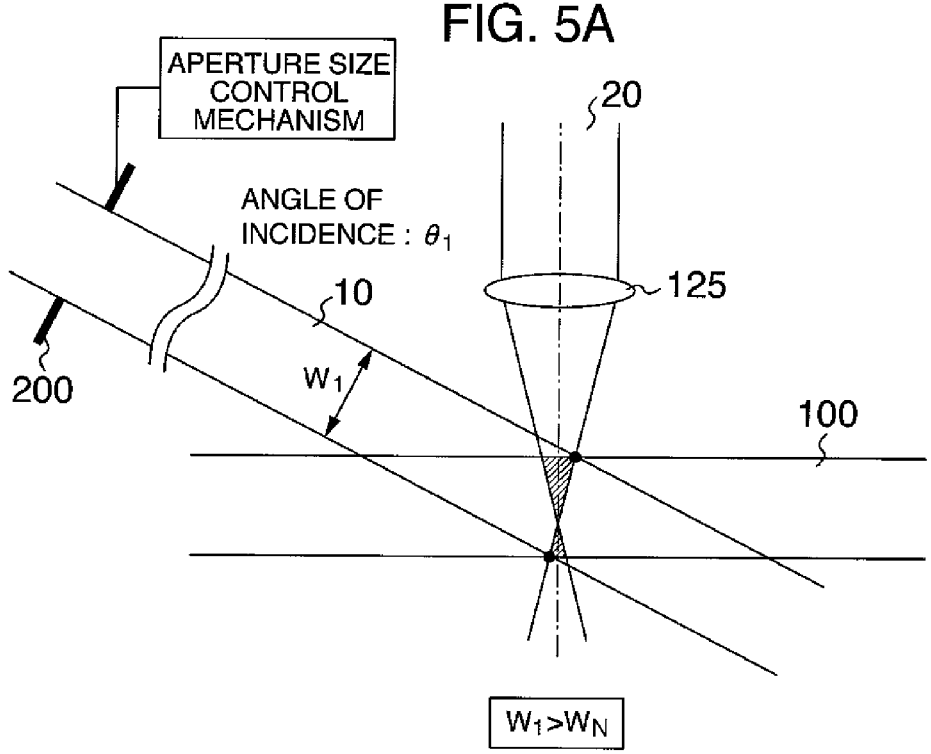
FIGS. 5A and 5B are schematic diagrams representing a state where a size of aperture of the reference beam is controlled.
Figure 5B:
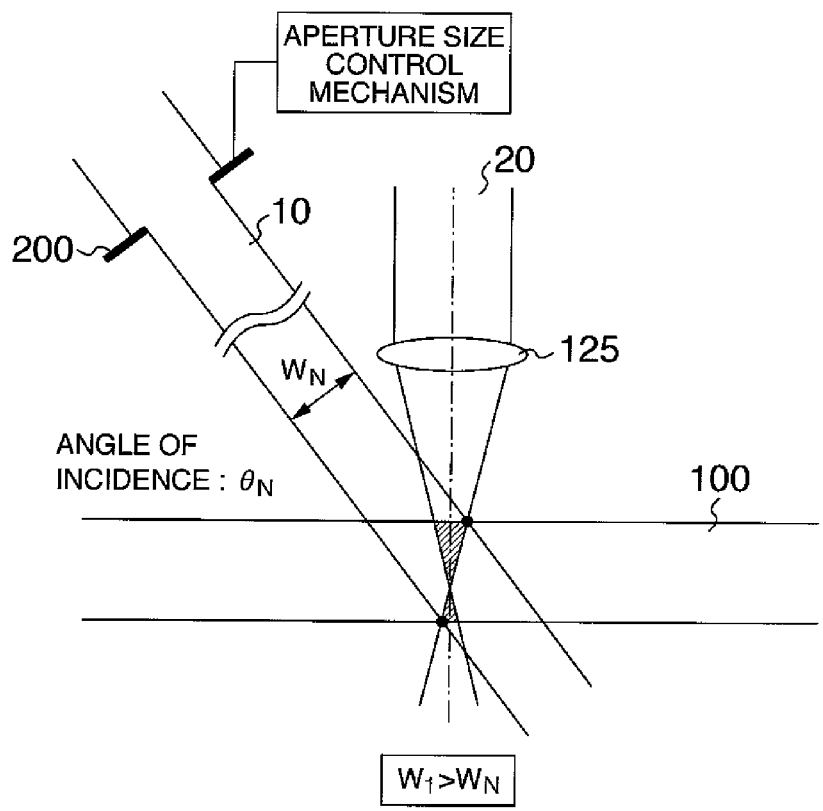

The optical pickup apparatus in the embodiment has a mechanism which can change a size of aperture 200 as shown in FIGS. 5A and 5B. The mechanism for changing the aperture size is not particularly limited but, for example, a mechanism for electrically controlling the aperture size by using a liquid crystal device or a mechanism for mechanically controlling the aperture size may be used.

In the case where an angle between the signal beam 20 and the reference beam 10 is large as shown in FIG. 5A and in the case where an angle between the signal beam 20 and the reference beam 10 is smaller than the case of FIG. 5A as shown in FIG. 5B, a difference occurs in the required size of reference beam to perfectly cover the signal beam in the storage medium. For example, with respect to the required size of reference beam to cover the signal beam in the storage medium, as will be obvious from a geometrical viewpoint, the size of the reference beam in FIG. 5B can be set to be smaller than that in FIG. 5A. Therefore, in the embodiment, a mechanism which can change the size of aperture 200 is provided and it has a feature that as shown, for example, in FIG. 5B, by decreasing the size of aperture 200, the wastefully exposed region in the storage medium can be reduced. As a setting location of the aperture, it is desirable to arrange the aperture to a location where only the size of the reference beam can be changed without having an influence on the size of the signal light beam. For example, in the case of the configuration illustrated in FIG. 4, it is desirable to arrange the aperture to an arbitrary location on an optical path where the reference beam reflected by the prism 105 progresses toward the optical information storage medium 100.

Embodiment 2

Figure 6:
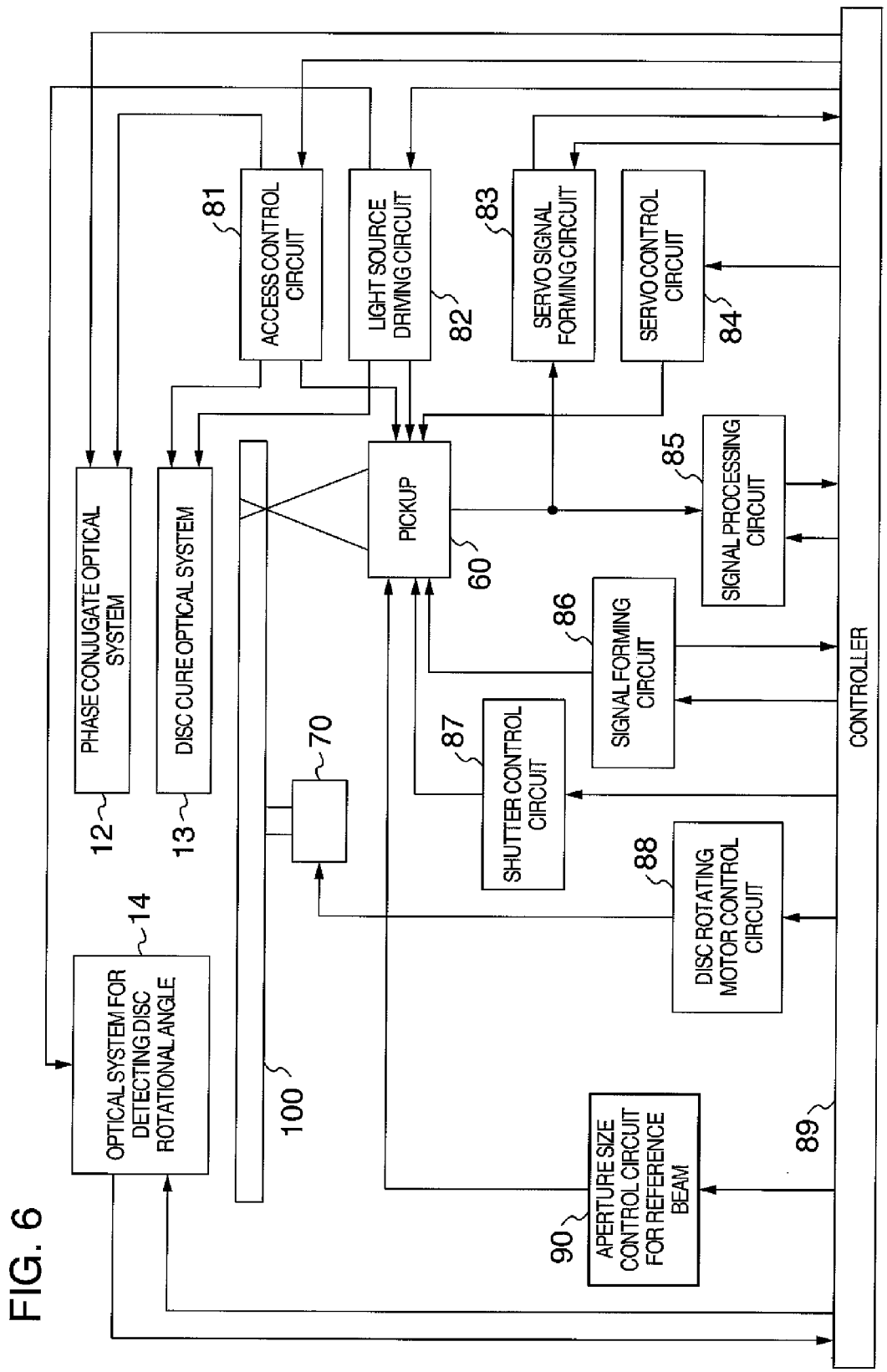
FIG. 6 is a schematic diagram representing an embodiment of an optical information recording and reproducing apparatus.

FIG. 6 represents a whole configuration of an optical information recording and reproducing apparatus for recording and/or reproducing digital information by using a holography.

The optical information recording and reproducing apparatus has: an optical pickup apparatus 60 having a configuration as shown in, for example, FIG. 4; a phase conjugate optical system 12; a disc cure optical system 13; an optical system 14 for detecting a rotational angle of a disc; and a rotating motor 70. The optical information storage medium 100 can be rotated by the rotating motor 70.

The optical pickup apparatus 60 plays a role for emitting the reference beam and the signal beam to the optical information storage medium 100 and recording the digital information by using the holography.

At this time, the information signal to be recorded is sent to the spatial light modulator in the optical pickup apparatus 60 through a signal forming circuit 86 by a controller 89 and the signal beam is modulated by the spatial light modulator.

In the case of reproducing the information recorded in the optical information storage medium 100, a phase conjugate beam of the reference beam emitted from the optical pickup apparatus 60 is formed by the phase conjugate optical system 12. The phase conjugate beam is a light wave which progresses in the opposite direction while keeping the same wavefront as that of the input beam. The recovered beam which is recovered by the phase conjugate beam is detected by a photodetector, which will be described hereinafter, in the optical pickup apparatus 60 and the signal is reproduced by a signal processing circuit 85.

An exposure time of each of the reference beam and the signal beam which are exposed to the optical information storage medium 100 can be adjusted by a method in which an opening/closing time of the shutter in the optical pickup apparatus 60, which will be described hereinafter, is controlled by the controller 89 through a shutter control circuit 87.

The disc cure optical system 13 plays a role of producing a light beam which is used for each of pre-cure and post-cure of the optical information storage medium 100. The pre-cure indicates such a pre-step that when the information is recorded to a desired position in the optical information storage medium 100, a predetermined light beam is preliminarily exposed before the reference beam and the signal beam are exposed to the desired position. The post-cure indicates such a post-step that after the information was recorded to the desired position in the optical information storage medium 100, a predetermined light beam is exposed to the desired position to be made unrecordable.

The optical system 14 for detecting the rotational angle of the disc is used to detect the rotational angle of the optical information storage medium 100. In the case of adjusting the optical information storage medium 100 to a predetermined rotational angle, a signal in accordance with the rotational angle is detected by the optical system 14 for detecting the rotational angle of the disc and the rotational angle of the optical information storage medium 100 can be controlled by the controller 89 by using the detected signal through a disc rotating motor control circuit 88.

A predetermined light source driving current is supplied from a light source driving circuit 82 to a light source in each of the optical pickup apparatus 60, the disc cure optical system 13, and the optical system 14 for detecting the rotational angle of the disc. A light beam of a predetermined light amount can be emitted from each of the light sources.

A mechanism which can slide a position in the radial direction of the optical information storage medium 100 is provided for the optical pickup apparatus 60, the phase conjugate optical system 12, and the disc cure optical system 13. Position control is performed through an access control circuit 81.

Since the recording technique using the holography is a technique which can record information of a super high density, there is such a tendency that, for example, an allowable error for an inclination or a positional deviation of the optical information storage medium 100 is extremely small. Therefore, it is also possible to provide with, for example, a mechanism for detecting a deviation amount of a deviation factor of the small allowable error such as inclination, positional deviation, or the like of the optical information storage medium 100 in the optical pickup apparatus 60, and a servo mechanism for forming a signal for servo control by a servo signal forming circuit 83 and correcting the deviation amount through a servo control circuit 84 in the optical information recording and reproducing apparatus.

With respect to the optical pickup apparatus 60, phase conjugate optical system 12, disc cure optical system 13, and optical system 14 for detecting the rotational angle of the disc, several or all of the optical system configurations may be collected and simplified.

As a feature of the embodiment, a control circuit 90 for controlling the size of aperture of the reference beam is provided in the optical information recording and reproducing apparatus. The size of aperture of the reference beam provided in the optical pickup apparatus 60 can be controlled as occasion demands. For example, as shown in FIGS. 5A and 5B, by changing the size of aperture 200 in accordance with the angle of incidence of the reference beam to the optical information storage medium 100, the wastefully exposed region can be reduced.

As mentioned above, with respect to the size of light beam of the reference beam which is necessary to cover the signal beam in the storage medium, as will be obvious from the geometric viewpoint, the larger the difference of angle between the signal beam and the reference beam is, the larger the required size of the reference beam is. Therefore, for example, it is also possible to control in such a manner that when the difference of angle between the signal beam and the reference beam is larger than a predetermined angle, the aperture size is increased, and when the difference of angle between the signal beam and the reference beam is smaller than the predetermined angle, the aperture size is decreased.

Such a mechanism is effective not only to the holographic recording mode but also to the reproducing mode. That is, by properly adjusting the exposure region of the reference beam for reproducing, a crosstalk can be reduced.

Embodiment 3

Figure 7A:
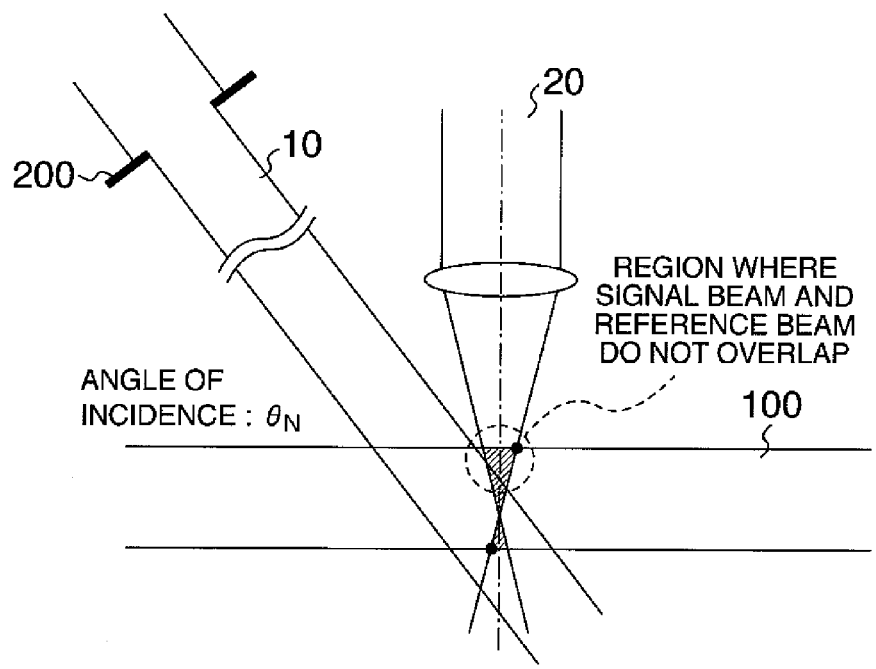
Figure 7B:
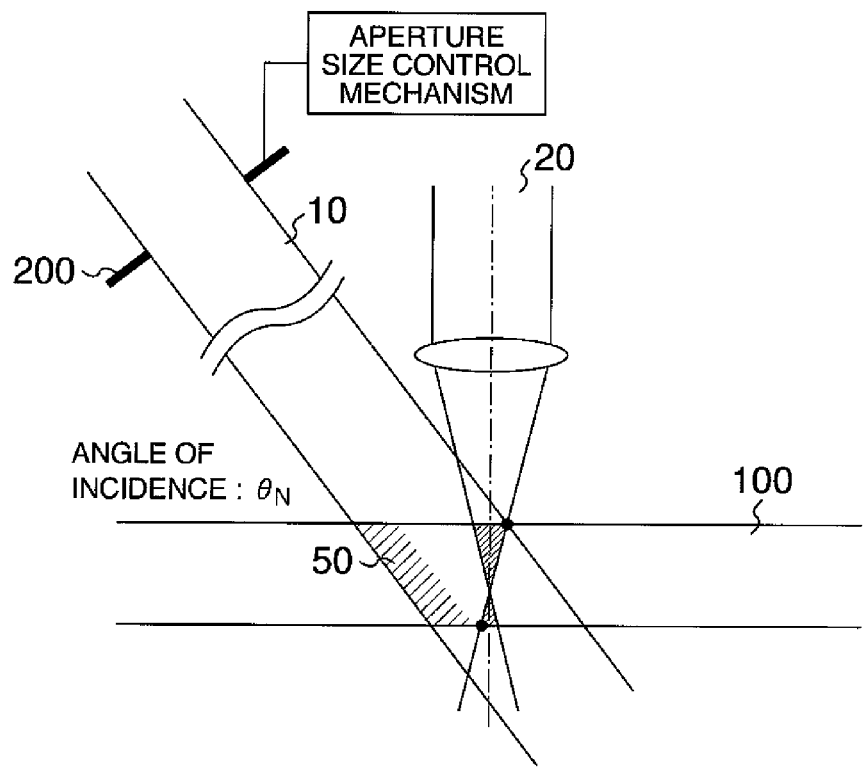

In addition to that the size of aperture 200 of the reference beam can be controlled as shown in FIGS. 5A and 5B, the optical pickup apparatus of the invention may have a mechanism which can control the position of the aperture 200 as shown in FIGS. 7A to 7C.

For example, even in an optical pickup apparatus in which parts have been precisely assembled, there may be a case where various optical parts in the optical pickup apparatus are deviated from the initial positions due to a change in environment such as temperature or humidity with the elapse of time. Therefore, for example, as shown in FIG. 7A, there is a case where a deviation occurs in the exposing position of the reference beam, so that a region where the signal beam and the reference beam do not overlap is generated. To avoid such a state, it is also possible to render the reference beam sufficiently covers the signal beam by increasing the aperture size as shown in FIG. 7B. However, in such a state, a wastefully exposed region 50 is generated.

Therefore, in the embodiment, for example, as shown in FIG. 7C, a mechanism which can change the position of the aperture 200 of the reference beam is provided. By such a mechanism, the wastefully exposed region 50 is reduced and the aperture position can be controlled so that the reference beam sufficiently covers the signal beam. The mechanism for changing the aperture position is not particularly limited but, for example, a mechanism for electrically controlling an aperture pattern by using a liquid crystal device or a mechanism for mechanically controlling the aperture position may be used.

Figure 8A:
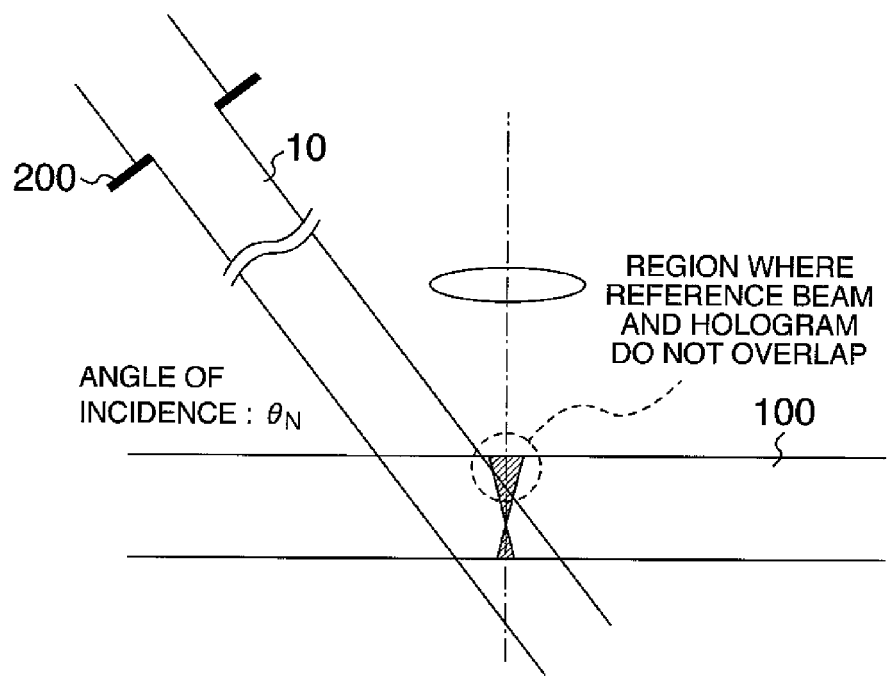
FIGS. 8A to 8C are schematic diagrams representing a state where the position of the aperture is controlled upon reproduction.
Figure 8B:
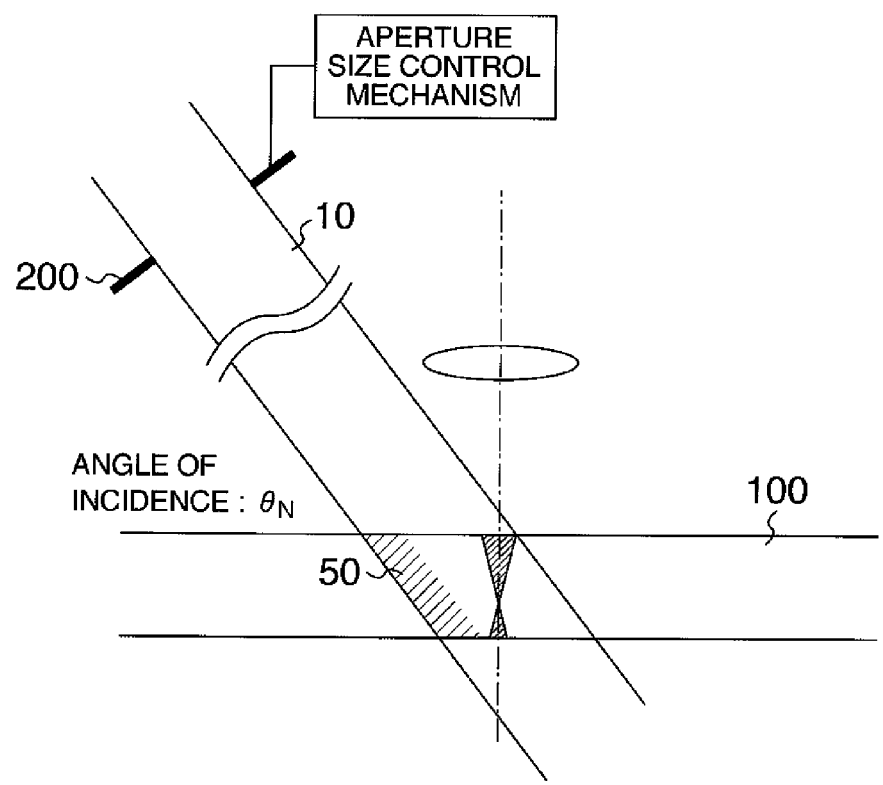
Figure 8C:
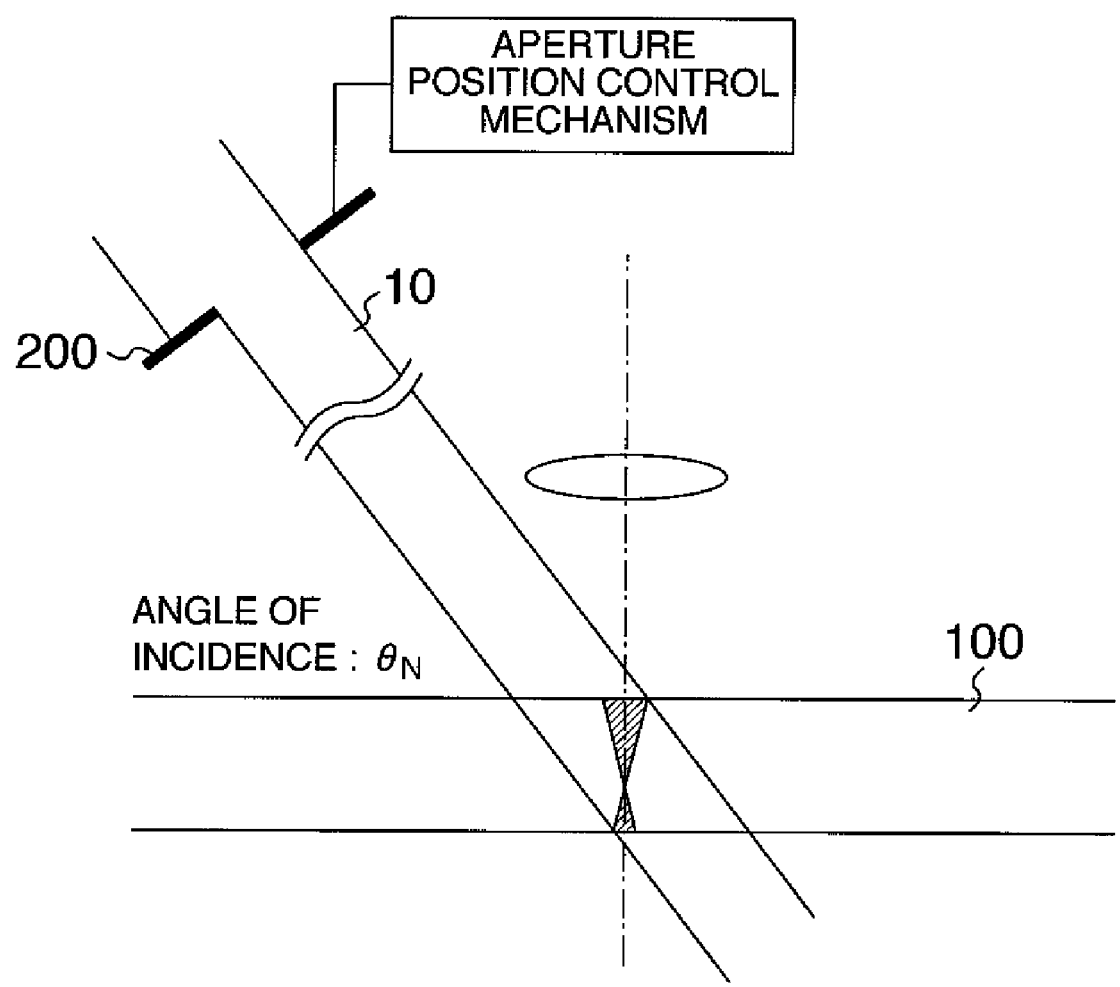

Such a mechanism is effective not only to the holographic recording mode but also to the reproducing mode. For example, when the exposing position of the reference beam is deviated upon reproduction as shown in FIG. 8A, if the aperture size of the reference beam is increased as shown in FIG. 8B, the information from the hologram recorded in the wastefully exposed region 50 is also reproduced and becomes a crosstalk component and deteriorates the quality of the recovered image. Therefore, by controlling the positional deviation of the aperture as shown in FIG. 8C, the reference beam can sufficiently cover the hologram and the crosstalk component can be reduced.

Embodiment 4

Figure 9:
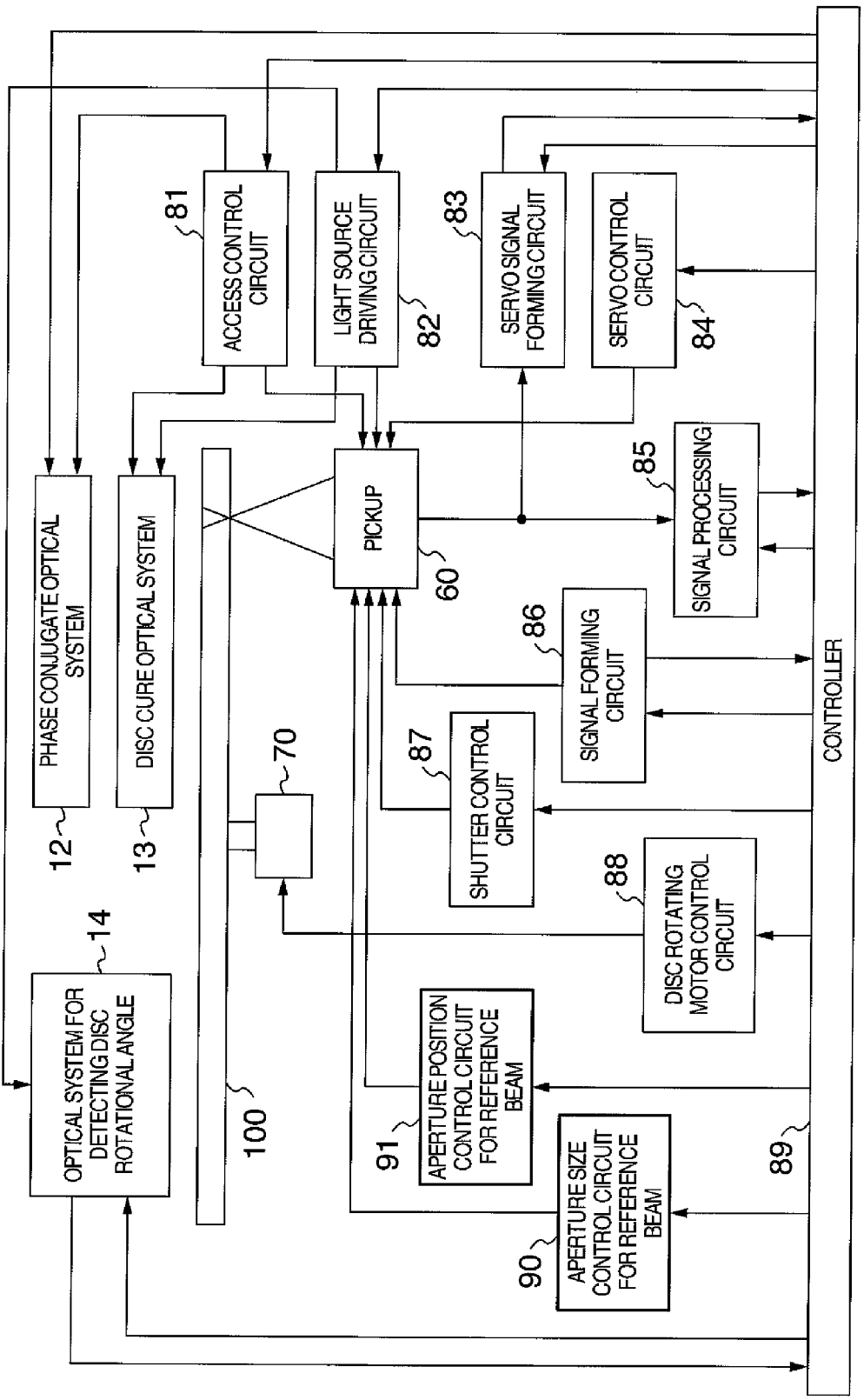
FIG. 9 is a schematic diagram representing an embodiment of an optical information recording and reproducing apparatus.

FIG. 9 represents a whole configuration of the optical information recording and reproducing apparatus for recording and/or reproducing digital information by using the holography. Since the configuration is substantially the same as that of FIG. 6 in the embodiment 2, although its detailed description is omitted here, it has a feature that a control circuit 91 for controlling the aperture position of the reference beam is added.

Although an example, in which the aperture size control circuit 90 of the reference beam and the aperture position control circuit 91 of the reference beam are controlled, is shown in the following description, even in an embodiment in which only the aperture position control circuit 91 of the reference beam is controlled, of course, there is also a case where the effect of reducing the wastefully exposed region on the storage medium is obtained.

In the embodiment, the size or position of the aperture of the reference beam arranged in the optical pickup apparatus 60 can be controlled as occasion demands. For example, in the case where the region where the reference beam does not overlap the signal beam was generated as shown in FIG. 7A, or in the case where the region where the reference beam does not overlap the hologram was generated as shown in FIG. 8A, such regions where the reference beam does not overlap is reduced by changing the size or position of the aperture.

Figure 10A:
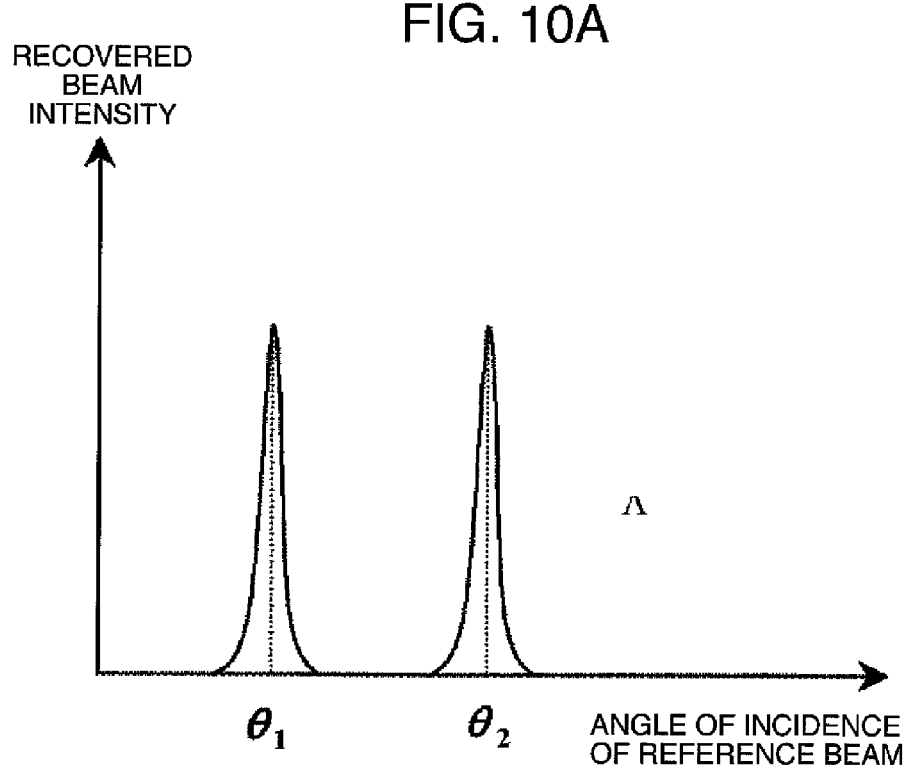
FIGS. 10A and 10B are schematic diagrams representing a Bragg selectivity of recovered beam.
Figure 10B:
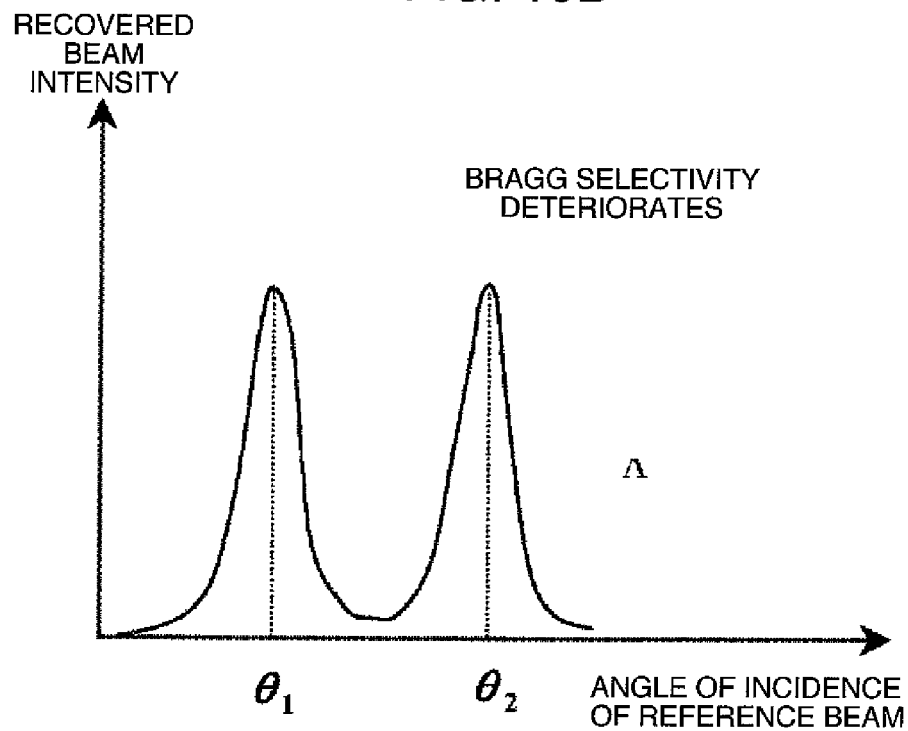
Figure 11A:
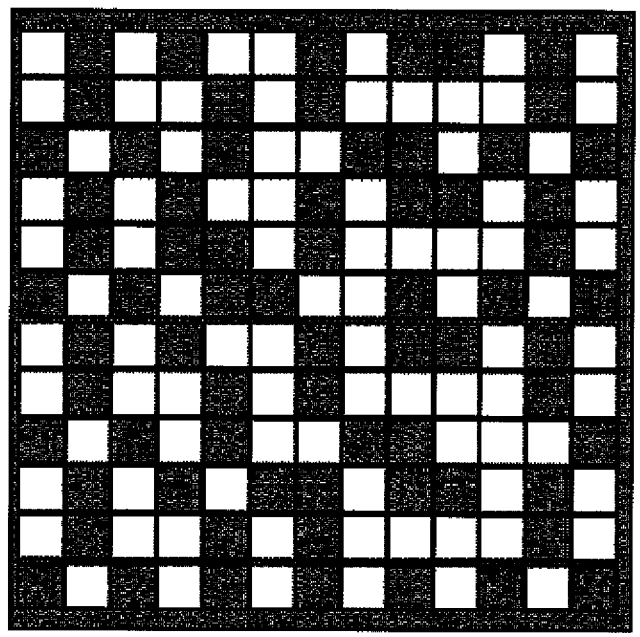
FIGS. 11A and 11B are schematic diagrams representing a recovered image.
Figure 11B:
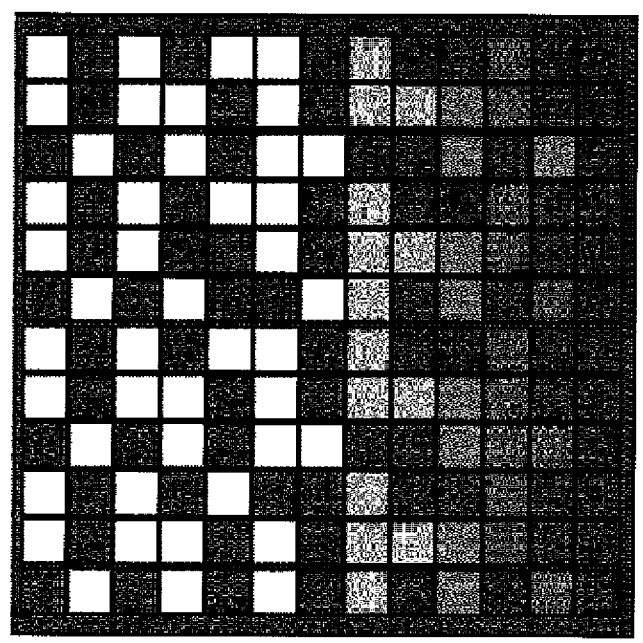

Generally upon recording, when the region where the reference beam and the signal beam do not overlap is generated, a thick hologram cannot be satisfactorily formed. Therefore, for example, the Bragg selectivity of the recovered beam is deteriorated as shown in FIGS. 10A and 10B or a part of a holographic reproduction image becomes dark as shown in FIGS. 11A and 11B, so that the reproducing quality deteriorates.

Accordingly, as for timing for the driving operation for controlling the size or position of the aperture of the reference beam, for example, after the information was recorded into the optical information storage medium 100, its recording quality is verified, an intensity or a SNR (Signal to Noise Ratio) of the recovered beam is detected as an evaluation index, and when a detected value is inferior to a predetermined reference value, the size or position of the aperture of the reference beam is controlled. The evaluation indices are not limited to them but, for example, another index such as diffraction efficiency or the like may be used so long as it indicates the reproducing quality.

The embodiment can be applied not only to the recording and reproducing apparatus but also to an optical information reproducing apparatus serving as a read only apparatus. In the optical information reproducing apparatus, as for the timing for the driving operation for controlling the size or position of the aperture of the reference beam, for example, when an intensity, diffraction efficiency, SNR, or the like of the recovered beam is inferior to the predetermined reference value, the size or position of the aperture of the reference beam may be controlled. The operation for comparing such a value with the predetermined reference value may be executed, for example, as a learning operation after the disc was inserted into the optical information reproducing apparatus or may be properly executed during the reproduction in accordance with a reproducing region such as an inner region or an outer region of the disc or the like.

It should be further understood by those skilled in the art that although the foregoing description has been made on embodiments of the invention, the invention is not limited thereto and various changes and modifications may be made without departing from the spirit of the invention and the scope of the appended claims.

The invention claimed is:

1. An optical information reproducing apparatus or an optical information recording and reproducing apparatus for recording information into an optical information storage medium by using a signal beam and a reference beam by using holography or for reproducing the information recorded in the optical information storage medium by using the reference beam, wherein
   an optical pickup apparatus configured to emit said signal beam and said reference beam comprises:
   an optical pickup unit having an aperture configured to control an aperture size of said reference beam;
   a control unit configured to control said aperture size of said reference beam that enters said optical information storage medium; and
   wherein said aperture size of said reference beam is controlled in accordance with an incident angle of said reference beam that enters said optical information storage medium.

2. An optical information reproducing apparatus or an optical information recording and reproducing apparatus for recording information into an optical information storage medium by using a signal beam and a reference beam by using holography or for reproducing the information recorded in the optical information storage medium by using the reference beam, wherein
   an optical pickup apparatus configured to emit said signal beam and said reference beam comprises:
   an optical pickup unit having an aperture configured to specify an aperture position of light beam of said reference beam;
   a control unit configured to control an incident position of said reference beam that enters said optical information storage medium; and
   wherein said aperture position of said reference beam is controlled in accordance with an incident angle of said reference beam that enters said optical information storage medium.

3. An apparatus according to claim 1, wherein said apparatus is configured to record the information into said optical information storage medium by an angular multiplexing method, and/or is configured to reproduce the information recorded in said optical information storage medium by the angular multiplexing method.

4. An apparatus according to claim 2, wherein said apparatus is configured to record the information into said optical information storage medium by an angular multiplexing method, and/or is configured to reproduce the information recorded in said optical information storage medium by the angular multiplexing method.

5. An apparatus according to claim 3, wherein when said reference beam enters said optical information storage medium, said reference beam enters as an almost parallel beam.

6. An apparatus according to claim 4, wherein when said reference beam enters said optical information storage medium, said reference beam enters as an almost parallel beam.

7. An apparatus according to claim 1, wherein, when an angle between said signal beam and said reference beam that enters said optical information storage medium is larger than a predetermined reference value, said aperture size of said reference beam is enlarged, and when said angle is smaller than said predetermined reference value, a beam diameter of said reference beam is reduced.

8. An apparatus according to claim 2, wherein when an angle between said signal beam and said reference beam that enters said optical information storage medium is larger than a predetermined reference value, said aperture position of said reference beam is controlled, and when said angle is smaller than said predetermined reference value, a beam diameter of said reference beam is reduced.

9. An apparatus according to claim 1, wherein after the information is recorded into said optical information storage medium, if a result obtained by verifying recording quality is inferior to a predetermined reference value, the size of said aperture is controlled.

10. An apparatus according to claim 1, wherein when the information recorded in said optical information storage medium is reproduced, if a quality of a reproduction signal is inferior to a predetermined reference value, the size of said aperture is controlled.

11. An apparatus according to claim 2, wherein after the information is recorded into said optical information storage medium, if a result obtained by verifying recording quality is inferior to a predetermined reference value, the position of said aperture is controlled.

12. An apparatus according to claim 2, wherein when the information recorded in said optical information storage medium is reproduced, if a quality of a reproduced signal is inferior to a predetermined reference value, the position of said aperture is controlled.

* * * * *